(12) United States Patent
Robota et al.

(10) Patent No.: US 9,012,710 B2
(45) Date of Patent: Apr. 21, 2015

(54) FUEL COMPOSITIONS CONTAINING AN ISOMERIZED COMPONENT OF A SINGLE CARBON NUMBER AND METHODS OF PREPARING THE FUEL COMPOSITIONS

(75) Inventors: Heinz J. Robota, Dayton, OH (US); Jhoanna C. Alger, Dayton, OH (US)

(73) Assignee: University of Dayton, Dayton, OH (US)

( * ) Notice: Subject to any disclaimer, the term of this patent is extended or adjusted under 35 U.S.C. 154(b) by 289 days.

(21) Appl. No.: 13/561,790

(22) Filed: Jul. 30, 2012

(65) Prior Publication Data

US 2013/0109893 A1    May 2, 2013

Related U.S. Application Data

(60) Provisional application No. 61/513,135, filed on Jul. 29, 2011.

(51) Int. Cl.

| | |
|---|---|
| C10L 1/04 | (2006.01) |
| C07C 5/13 | (2006.01) |
| C07C 5/27 | (2006.01) |
| C10G 45/64 | (2006.01) |
| C10G 67/04 | (2006.01) |
| C10G 21/14 | (2006.01) |
| B01J 29/12 | (2006.01) |

(52) U.S. Cl.
CPC . *C10L 1/04* (2013.01); *C10G 45/64* (2013.01); *C10G 67/04* (2013.01); *C10G 21/14* (2013.01); *B01J 29/126* (2013.01)

(58) Field of Classification Search
USPC ............... 585/253, 734–751, 1, 14, 16
See application file for complete search history.

(56) References Cited

U.S. PATENT DOCUMENTS

| | | | | |
|---|---|---|---|---|
| 5,990,371 | A  * | 11/1999 | Martens et al. | 585/739 |
| 6,198,015 | B1 * | 3/2001 | Marcilly et al. | 585/739 |
| 6,350,370 | B1 * | 2/2002 | Benazzi et al. | 208/111.01 |
| 6,733,658 | B2 * | 5/2004 | Benazzi et al. | 208/111.01 |
| 7,217,852 | B1 * | 5/2007 | DeHaan et al. | 585/734 |
| 7,846,323 | B2 * | 12/2010 | Abhari et al. | 208/57 |

(Continued)

OTHER PUBLICATIONS

Cheng-Hui Geng, Fei Zhang, Zhi-Xian Gao, Liang-Fu Zhao, Jing-Lai Zhou; Hydroisomerization of n-tetradecane over Pt/SAPO-11 Catalyst; Catalysis Today 93-95 (Sept. 2004) 485-491.

(Continued)

*Primary Examiner* — Ellen McAvoy
(74) *Attorney, Agent, or Firm* — Dinsmore & Shohl, LLP (57) ABSTRACT

Fuel compositions containing an isomerized component of a single carbon number may contain at least 97 wt. %, based on the total weight of the fuel composition, of an isomerized component consisting of aliphatic paraffin isomers all having the formula $C_nH_{2n+2}$, where $10 \leq n \leq 22$ and n has the same value for each aliphatic paraffin isomer in the isomerized component. The fuel compositions have a normal alkane content of less than 10 wt. %, based on the total weight of the fuel composition. Methods for preparing the fuel compositions include hydroisomerizing a normal alkane starting material to form an isomerized mixture and subsequently removing remnant normal alkanes from the isomerized mixture by solvent dewaxing and/or distillation. Some of the fuel compositions may have freezing points at or below −47° C., making them amenable for use a surrogate fuels in the place of JP-8.

15 Claims, 3 Drawing Sheets

(56) References Cited

U.S. PATENT DOCUMENTS

| | | | |
|---|---|---|---|
| 8,058,492 B2* | 11/2011 | Anumakonda et al. | 585/14 |
| 8,101,811 B2* | 1/2012 | Burton et al. | 585/739 |
| 8,142,527 B2* | 3/2012 | Herskowitz et al. | 44/605 |
| 8,143,469 B2* | 3/2012 | Koivusalmi et al. | 585/733 |
| 8,314,274 B2* | 11/2012 | Marker et al. | 585/240 |
| 2014/0005448 A1* | 1/2014 | Frey et al. | 585/240 |

OTHER PUBLICATIONS

H. Deldari; Suitable catalysts for hydroisomerization of long-chain normal paraffins; Applied Catalysis A: General 293 (Aug. 2005) 1-10.

Kwang-Cheon Park, Son-Ki Ihm; Comparison of Pt/zeolite catalysts for n-hexadecane hydroisomerization; Applied Catalysis A: General 203 (Oct. 2000) 201-209.

* cited by examiner

FUEL COMPOSITIONS CONTAINING AN ISOMERIZED COMPONENT OF A SINGLE CARBON NUMBER AND METHODS OF PREPARING THE FUEL COMPOSITIONS

CROSS-REFERENCES TO RELATED APPLICATIONS

This application claims the benefit of priority under 35 U.S.C. §119(e) to U.S. Provisional Application Ser. No. 61/513,135, filed Jul. 29, 2011.

STATEMENT REGARDING FEDERALLY SPONSORED RESEARCH OR DEVELOPMENT

This invention was made with government support under United States Air Force Cooperative Grant Numbers F33615-03-2-2347 and FA8650-10-2-2934. The government has certain rights in the invention.

TECHNICAL FIELD

The present invention relates generally to fuel compositions and methods and, more particularly, to fuel compositions having suitable characteristics for use as aviation fuels, fuel components, or fuel additives, and to methods for producing the same.

BACKGROUND

Development of fuels and fuel sources that may reduce dependence on petroleum has become a massive undertaking for industries having large needs for fuels, such as the aviation industry, for example. Many alternative fuels have been developed, and many remain to be developed, but whenever an alternative fuel is proposed for widespread use, it must be rigorously tested to ensure it meets all necessary specifications. For example, the first generation of synthetic paraffinic kerosene (SPK) alternative fuels was produced via the Fischer-Tropsch (F-T) process. Subsequently, UOP and others developed a second generation process based on the hydrotreating of esters and fatty acids (HEFA) (i.e., seed oil or waste oils and grease) to produce hydrotreated renewable jet (HRJ). The properties of these candidate alternative aviation fuels have been compared to the established standards.

The MIL-DTL-83133G specification for United States Air Force aviation fuel (JP-8) includes 27 separate requirements ranging from physical properties (flash point, heating value, boiling range), corrosion resistance, thermal stability, and production quality (particulate matter, gum content, etc.). This petroleum-based specification has evolved as the knowledge base of the aviation industry has grown over the last hundred years. In contrast, the knowledge base for alternative aviation fuels is much smaller.

New non-petroleum fuels must be subjected to extensive evaluation. Candidate fuels may be evaluated using a multi-step process including an R&D phase that includes the determination of physical and chemical properties, fit-for-purpose characteristics, as well as component rig testing (for operability and durability). These tests may be followed by certification testing where engine and auxiliary-power unit performance are evaluated. It has been found that the low fuel density, low seal swelling, and lack of aromatics of the F-T and HRJ fuels affect aircraft range, fuel gauging and leaking, lubrication, and combustion, making the fuels unsuitable as direct drop-in replacements. However, blends of JP-8 and SPK (from either F-T or HEFA processes) have shown great promise. In these blends, the petroleum-derived fraction provided molecular components that fulfilled a variety of performance requirements that pure SPK could not. Thus, some large-scale operations such as the United States Air Force have certified using a 50/50 mixture of JP-8 and F-T SPK. A second series of fuel certification trials has been successfully conducted using a 50/50 mixture of JP-8 and HRJ.

Next generation fuels are now under development focusing on biobased feedstocks such as lignocellulose and sugar/starches. Biobased fuels have the potential to be cost competitive, sustainable, capable of being produced in significant quantities, and have greenhouse-gas footprints that are lower than petroleum-based fuels. If users want to exploit such potential alternative fuel, it is important to understand the relationship between fuel composition and fit-for-purpose characteristics and engine performance.

The aircraft-engine industry and the Air Force identified a weakness in the current testing of alternative fuels in combustion rigs and engines. The performance of the alternative fuel was compared to a JP-8 baseline, but the JP-8 used was whatever was available. If the alternative fuel performed worse (or better) than the reference, it was not clear how that alternative fuel performance fit into the "experience base" of current jet fuels. The alternative may have been worse than the JP-8 tested, but perhaps well within the "typical" range for that particular property. So, the industry decided that what was needed were reference fuels for testing that would span the range, from "worst case" to "average fuel, to "best case."

One property area being studied is boiling point range. Whereas current fuels such as F-T SPK and HRJ contain a large range of carbon numbers, generally from C7 to C16, the next generation alternative fuels, such as those produced by alcohol oligomerization or direct fermentation, contain only a few carbon numbers. This narrow carbon-number distribution results in a narrow boiling point range, which might be a concern for engine operability. To determine the effect of a narrow boiling point range on engine operability, it is necessary to select and then produce suitable reference fuels in quantities large enough to support a range of tests, up to and including auxiliary power-unit combustion trials.

In this regard, a "worst case" reference fuel having a narrow boiling point range may be a fuel consisting essentially of alkanes of a single carbon number. Even so, to be amenable to a full range of testing, the reference fuel must be formulated or produced to meet certain specifications of existing fuels such as JP-8. The specifications may include freezing point and/or flash point, for example. Thus, in theory if a test run performed using a reference fuel is successful, it may be reasoned that narrow boiling point range or low flash point in alternative fuels are not likely to represent issues for engine operability.

In view of the above issues, there remain needs for fuel compositions having narrow boiling point ranges and sufficiently low freezing points to enable them to be used as fuels, fuel components, or fuel additives, whether for general use or as references to be compared against existing fuels. Accordingly, further ongoing needs exist for methods that can efficiently produce such fuel compositions in quantities sufficient for large-scale testing operations or general use.

SUMMARY

Against the above background, according to some embodiments, fuel compositions are described. The fuel compositions may contain at least 97 wt. %, based on the total weight of the fuel composition, of an isomerized component consisting of aliphatic paraffin isomers all having the formula $C_nH_{2n+2}$, where $10 \leq n \leq 22$ and n has the same value for each aliphatic paraffin isomer in the isomerized component. The fuel compositions have a normal alkane content of less than 10 wt. %, based on the total weight of the fuel composition.

According to some embodiments, methods for preparing fuel compositions are described. The methods may include hydroisomerizing an alkane starting material of normal alkanes to form an isomerized mixture containing mono-branched alkanes, multi-branched alkanes, and residual normal alkanes. The alkane starting material may contain at least 90 wt. %, based on the total weight of the alkane starting material, of normal alkane having a single carbon number of from 10 to 22. The methods also may removing at least a portion of the residual normal alkanes from the isomerized mixture to form a fuel composition having a normal alkane content of less than 10 wt. %, based on the total weight of the fuel composition.

Further embodiments are directed, fuel compositions according to embodiments described herein, which are prepared by methods for preparing fuel compositions according to other embodiments described herein.

Additional features and advantages of the embodiments described herein will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Various embodiments of fuel compositions and methods for producing the fuel compositions now will be described.

As used herein, the term "fuel composition" refers to a composition that may be used as a fuel, as a component of a fuel, or as an additive to a fuel. In some embodiments, the fuel compositions may be suitable for widespread general use to provide energy or to propel vehicles such as aircraft or automobiles. In other embodiments, the fuel compositions may be employed as reference fuels for reliable and reproducible operability comparisons with potential alternative fuels.

As used herein, the term "carbon number" refers to the number of carbon atoms in a particular hydrocarbon molecule, regardless of the arrangement of the carbon atoms within the particular hydrocarbon molecule. Two molecules having the same molecular formula but different molecular structures (e.g., straight-chain vs. branched) are "isomers" of each other. It follows that hydrocarbon molecules that are isomers of each other must all have the same carbon number. For example, n-hexane, 2-methylpentane, and 2,3-dimethylbutane are isomers of each other, because each have the same molecular formula ($C_6H_{14}$) and each have the same carbon numbers of 6. On the other hand, hydrocarbon molecules having the same carbon number are not necessarily isomers, because they can still have different molecular formulas. For example, n-hexane, 1-hexene, and benzene are not considered isomers of each other, because even though each has a carbon number of 6, their molecular formulas are all different (i.e., $C_6H_{14}$, $C_6H_{12}$ and $C_6H_6$ respectively).

As used herein, the term "normal alkane" is used according to its commonly understood meaning and, therefore, refers to a hydrocarbon molecule having the formula $C_nH_{2n+2}$, in which the formula $C_nH_{2n+2}$ may be expressed also as a structural formula $H_3C-(CH_2)_{n-2}-CH_3$ ($n \geq 2$). That is, normal alkanes have straight carbon backbones and no branching.

As used herein, the term "branched alkane" refers to a hydrocarbon molecule having the formula $C_nH_{2n+2}$ that is not a normal alkane. Branched alkanes may be characterized by a number of "branch points," at which a $-CH_2-CH_2-$ portion anywhere along the carbon backbone of a normal alkane is replaced by a branched portion such as $-CH(CH_3)-$ (a methyl branch), $-CH(CH_2CH_3)-$ (an ethyl branch), or $-CH(CH_2CH_2CH_3)-$ (a propyl branch), for example. Thus, a mono-branched alkane contains a single branch point, a di-branched alkane contains two branch points, a tri-branched alkane contains three branch points, and so on. As used herein, the term "multi-branched alkane" refers to a branched alkane having greater than one branch point, such as two or three branch points, for example. The substitutions of branch portions for $-CH_2-CH_2-$ portions do not affect the number of hydrogen atoms in the branched alkane relative to the normal alkane. Therefore, every branched alkane according to the above definition has a normal-alkane isomer with the same carbon number as the branched alkane. For example, 4-methylnonane (a branched alkane $C_{10}H_{22}$, with carbon number 10) has the normal-alkane isomer n-decane (a normal alkane, also $C_{10}H_{22}$, also carbon number 10).

Except where noted otherwise, the term "normal alkane content" of a composition refers to the total weight of all normal alkanes in the composition, based on the total weight of the composition.

As used herein, the term "freezing point" refers to a freezing point determined by the ASTM method D-5972, which is incorporated herein by reference in its entirety.

According to some embodiments, a fuel composition may comprise an isomerized component consisting essentially of isomers of aliphatic alkanes each having the same carbon number. In preferred embodiments, the fuel compositions may be formulated to have freezing points at or below −47° C., the freezing point of the jet aviation fuel JP-8.

According to some embodiments, the fuel composition may comprise greater than 97 wt. %, based on the weight of the composition, of an isomerized component. In other embodiments, the fuel composition may comprise greater than 97.5 wt. %, greater than 98 wt. %, greater than 98.5 wt. %, greater than 99 wt. %, greater than 99.5 wt. %, greater than 99.9 wt %, or even 100 wt. %, based on the weight of the composition, of the isomerized component.

The isomerized component may consist of isomers of an aliphatic hydrocarbon having the formula $C_nH_{2n+2}$, where n is a single value for all isomers in the isomerized component and $10 \leq n \leq 22$ and represents the carbon number of the isomerized component. Thus, the isomerized component in any given composition may consist of $C_nH_{2n+2}$ isomers, each having the same molecular formula. In illustrative embodiments, the empirical formula may be selected from the group consisting of $C_{10}H_{22}$, $C_{11}H_{24}$, $C_{12}H_{26}$, $C_{13}H_{28}$, $C_{14}H_{30}$, $C_{15}H_{32}$, $C_{16}H_{34}$, $C_{17}H_{36}$, $C_{18}H_{38}$, $C_{19}H_4O$, $C_{20}H_{42}$, $C_{21}H_{44}$, and $C_{22}H_{46}$. In non-limiting exemplary embodiments, the empirical formula may be selected from the group consisting of $C_{10}H_{22}$, $C_{14}H_{30}$, $C_{16}H_{34}$, and $C_{18}H_{38}$. The isomers of the isomerized component may be normal alkanes or branched alkanes, and the branched alkanes may include mono-branched alkanes, di-branched alkanes, and tri-branched alkanes, for example.

The fuel compositions may include additional molecules having the formula $C_nH_{2n+2}$ that are not part of the isomerized component. In some embodiments, the additional molecules having the formula $C_nH_{2n+2}$ make up less than 3 wt. %, less than 2.5 wt. %, less than 2 wt. %, less than 1.5 wt. %, less than 1 wt. %, less than 0.5 wt. %, less than 0.1 wt. %, or 0 wt. % of the fuel composition, based on the total weight of the fuel composition. In some embodiments, the fuel compositions consist essentially of alkanes or consist of alkanes. In other embodiments, the fuel compositions may also include alkenes as minor byproducts. For example, the alkenes may make up less than 0.5 wt. %, preferably less than 0.1 wt. %, more preferably less than 0.05 wt. % of the fuel composition, based on the total weight of the fuel composition.

According to some embodiments, the fuel compositions have normal alkane contents of less than 10 wt. %. Preferably, the fuel compositions have normal alkane contents of less than 5.0 wt. %, less than 4.0 wt. %, or less than 3.0 wt. %. Most preferably, the fuel compositions have normal alkane contents of less than 2.5 wt. %, less than 2.0 wt. %, less than 1.0 wt. %, less than 0.5 wt. %, or less than 0.1 wt. %. In any of these embodiments, the fuel compositions may have from 0 wt. %, from 0.001 wt. %, from 0.01 wt. %, or from 0.1 wt. % as lower bounds to their normal alkane contents, for example.

The isomerized component of the fuel compositions includes branched alkanes. The branched alkanes of the isomerized component may include mono-branched alkanes, multi-branched alkanes, or mixtures thereof. In some embodiments, the isomerized component may contain greater than 97 wt. %, greater than 98 wt. %, greater than 99 wt. %, greater than 99.5 wt. %, or 100 wt. % branched alkanes. In embodiments in which the isomerized component contains both mono-branched alkanes and multi-branched alkanes, the weight ratio of mono-branched alkanes to multi-branched alkanes in the isomerized component may vary. In illustrative non-limiting embodiments, the isomerized components may contain both mono-branched alkanes and multi-branched alkanes, and the weight ratio of the mono-branched alkanes to the multi-branched alkanes may be from about 1:10 to about 10:1, from about 1:5 to about 5:1, from about 1:3 to about 3:1, from about 1:2 to about 2:1, from about 1:1.5 to about 1.5:1, from about 1:1.4 to about 1.4:1, from about 1:1.3 to about 1.3:1, or from about 1:1.2 to about 1.2:1.

In preferred but non-limiting embodiments, the isomerized components may contain both mono-branched alkanes and multi-branched alkanes, and the multi-branched alkanes may make up a higher weight percent of the isomerized component than the mono-branched alkanes. Thus, in such preferred non-limiting embodiments, the weight ratio of the mono-branched alkanes to the multi-branched alkanes may be less than 1:1, such as from 1:100 to 1:1, from 1:10 to 1:1, from 1:5 to 1:1, from 1:2 to 1:1, from 1:1.5 to 1:1, from 1:1.2 to 1:1, from 1:2 to 1:1.1, from 1:2 to 1:1.2, or from 1:1.5 to 1:1.1. In additional non-limiting embodiments, the isomerized component may contain or may consist of at least 50 wt. % or at least 55 wt. % or at least 60 wt. % or from 45 wt. % to 75 wt. % multi-branched alkanes, based on the total weight of the isomerized component; from 30 wt. % to 50 wt. % or from 35 wt. % to 50 wt. % or from 35 wt. % to 45 wt. % or from 40 wt. % to 50 wt. % mono-branched alkanes, based on the total weight of the isomerized component; and less than 10 wt. % or less than 5.0 wt. % or less than 2.0 wt. % or less than 1.5 wt. % or from 0 wt. % to 10 wt. % or from 0.1 wt. % to 5 wt. % or from 0.2 wt. % to 3 wt. % or from 0.2 wt. % to 2.5 wt. % or from 0.2 wt. % to 2.0 wt. % or from 0.001 wt. % to 1.5 wt. % normal alkanes, based on the total weight of the isomerized component.

In an illustrative non-limiting embodiment, the fuel composition may comprise greater than 97 wt. %, based on the weight of the composition, of an isomerized component consisting of aliphatic alkane isomers having the formula $C_{14}H_{30}$. In such an embodiment, the remainder of fuel composition (3 wt. % or less) may contain remnant products such as alkenes or other aliphatic alkanes having the formula $C_nH_{2n+2}$, where $10 \leq n \leq 22$. Also in such an embodiment, the fuel composition may have a normal alkane content of less than 10 wt. %, less than 5.0 wt. %, less than 2.5 wt. %, less than 2.0 wt. %, less than 1.5 wt. %, less than 1.0 wt. %, less than 0.5 wt. %, from 0.1 wt. % to 2.5 wt. %, or from 0.5 wt. % to 2.0 wt. %, for example. The isomerized component may consist essentially of mono-branched alkanes, multi-branched alkanes, and normal alkanes, each having the formula $C_{14}H_{30}$. Branching of the branched alkanes may include methyl branches, ethyl branches, propyl branches, or mixtures thereof. The branching of may be located at any carbon atom on the branched alkanes. Preferably, isomerized component may consist essentially of mono-branched alkanes, multi-branched alkanes, and normal alkanes, in which the branches of the branched alkanes all are methyl branches. Preferably, the weight ratio of mono-branched alkanes to multi-branched alkanes in the isomerized component is less than 1.5:1, more preferably less than 1:1, still more preferably less than 1:1.1. The fuel composition comprising an isomerized component of $C_{14}H_{30}$ may have a freezing point equal to or lower than −47° C., preferably equal to or lower than −60° C. Thus, such a fuel composition may be well suited for use as a reference for a narrow-boiling fuel that meets the freeze point specification of JP-8.

In another illustrative non-limiting embodiment, the fuel composition may comprise greater than 97 wt. %, based on the weight of the composition, of an isomerized component consisting of aliphatic alkane isomers having the formula $C_{10}H_{22}$. In such an embodiment, the remainder of fuel composition (3 wt. % or less) may contain remnant products such as alkenes or other aliphatic alkanes having the formula $C_nH_{2n+2}$, where $10 \leq n \leq 22$. Also in such an embodiment, the fuel composition may have a normal alkane content of less than 10 wt. %, less than 5.0 wt. %, less than 2.5 wt. %, less than 2.0 wt. %, less than 1.5 wt. %, less than 1.0 wt. %, less than 0.5 wt. %, from 0.1 wt. % to 2.5 wt. %, or from 0.5 wt. % to 2.0 wt. %, for example. The isomerized component may consist essentially of mono-branched alkanes, multi-branched alkanes, and normal alkanes, each having the formula $C_{10}H_{22}$. Branching of the branched alkanes may include methyl branches, ethyl branches, propyl branches, or mixtures thereof. The branching of may be located at any carbon atom on the branched alkanes. Preferably, isomerized component may consist essentially of mono-branched alkanes, multi-branched alkanes, and normal alkanes, in which the branches of the branched alkanes all are methyl branches. Preferably, the weight ratio of mono-branched alkanes to multi-branched alkanes in the isomerized component is less than 1.5:1, more preferably less than 1:1, still more preferably less than 1:1.1. The fuel composition comprising an isomerized component of $C_{10}H_{22}$ may have a flash point equal to or greater than 38° C. Thus, such a fuel composition may be well suited for use as a reference for a narrow-boiling fuel that meets the flash point specification of JP-8.

Various embodiments of various fuel compositions with isomerized components have been described above. Methods for producing such fuel compositions now will be described. Though in some embodiments particular reference will be made to fuel compositions comprising a carbon-number 14 ($C_{14}H_{30}$) isomerized component, it should be understood that the methods described herein are applicable broadly to fuel compositions with isomerized components having carbon numbers other than 14. The methods may be employed in large-scale production of fuel compositions, at least on the scale of 500 gallons to 1000 gallons (about 2000 L to about 4000 L).

According to some embodiments, methods for preparing a fuel composition may include hydroisomerizing an alkane starting material. The alkane starting material may be a normal alkane having a carbon number of from 8 to 22. In some embodiments, the alkane starting material may have a normal alkane content of at least 97 wt. %, at least 98 wt. %, at least 99 wt. %, at least 99.5 wt. %, or even 100 wt. %. Preferably, the normal alkane content is derived from at least 90 wt. %, at least 95 wt. %, at least 98 wt. %, at least 99 wt. %, or even 100 wt. % normal alkanes with a carbon distribution sharply favoring a single carbon number or even consisting of a single carbon number such as 10, 14, or 16, for example. The hydroisomerization converts at least a portion of the normal alkane to an isomerized mixture containing mono-branched alkanes and multi-branched alkanes having the same carbon number as the starting material. The isomerized mixture may also contain residual starting material that remains a non-isomerized normal alkane. Then, at least a portion of the normal alkanes remaining in the isomerized mixture may be removed from the isomerized mixture. In some embodiments, removing the normal alkanes may comprise solvent dewaxing, described below. In other embodiments, removing the normal alkanes may comprise distillation, also described below.

In some embodiments, the alkane starting material may be prepared prior to its hydroisomerization. For example, normal alkanes of a given carbon number, particularly of a carbon number from 10 to 22, may be acquired most economically and with an acceptable level of purity by hydrogenating an alkene such as an α-olefin.

In an illustrative non-limiting embodiment, the alkane starting material may be an n-alkane such as n-tetradecane ($C_{14}H_{30}$). A pre-purified n-tetradecane, such as a reagent-grade n-tetradecane may be used, or the n-tetradecane may be prepared from a more economical α-olefin such as 1-tetradecene ($C_{14}H_{28}$). An α-olefin such as 1-tetradecene may be converted to n-tetradecane by hydrogenation, for example. For example, 1-tetradecene may be hydrogenated by sealing the 1-tetradecene in a vessel and adding an appropriate hydrogenation catalyst such as Pt/US-Y, for example, into the vessel. The vessel may be sealed, and catalyst may be activated by adding hydrogen to the vessel at a suitable flow rate while maintaining a suitable system pressure and temperature. Example flow rates may range from about 50 mL/min to about 500 mL/min, preferably around 100 mL/min. Example system pressures may range from about 50 psig to about 300 psig, preferably around 100 psig to 150 psig. Example system temperatures may range from about 80° C. to about 300° C., preferably from about 110° C. to about 200° C. It should be understood that the purity of the resulting n-tetradecane with regard to alkanes of carbon numbers other than 14 may depend on the purity of the initial 1-tetradecene. In preferred embodiments, the alkane starting material produced by hydrogenating the 1-tetradecene comprises at least 90 wt. %, at least 95 wt. %, at least 97 wt. %, at least 98 wt. %, at least 99 wt. %, at least 99.5 wt. %, or 100 wt. % n-tetradecane, based on the total weight of the alkane starting material. Any remainder of the alkane starting material that is not n-tetradecane may include other normal alkanes of carbon numbers other than 14 that may have been present in the carbon distribution of the 1-tetradecene, depending on the original source of the 1-tetradecene or on how the original 1-tetradecene itself was made.

According to some embodiments, the methods for preparing the fuel composition comprise hydroisomerizing the alkane starting material. In general, hydroisomerization can involve a complex mechanism that ultimately results in a mixture of branched and unbranched isomers from a starting material, particularly a starting material consisting essentially of normal alkanes. The complex mechanism may include breaking of carbon-carbon bonds and/or carbon-hydrogen bonds in the alkanes. The breaking of the bonds may be followed by formations of radicals or alkenes. The radicals or alkenes may subsequently combine with other molecules of alkane to form branched alkanes. The position and number of branches that result on the branched alkanes formed by hydroisomerization of normal alkanes are dictated by thermodynamics.

For any given mixture of alkane isomers of a certain carbon number, generally the normal alkane has the highest freezing point, and the freezing point decreases as the number of branches on the alkane is increased. Freezing points among alkanes of a certain carbon number and having a certain number of branches may vary further with respect to the position of the branch or branches along the alkane chain. As an illustration, typical freezing points of various alkane isomers of carbon number 14 are shown in TABLE 1 below:

TABLE 1

| Compound Name | Empirical Formula | Freezing Point (° C.) | Number of Methyl Branches |
|---|---|---|---|
| n-tetradecane | $C_{14}H_{30}$ | +6 | 0 |
| 3-methyltridecane | $C_{14}H_{30}$ | −37 | 1 |
| 2-methyltridecane | $C_{14}H_{30}$ | −24 | 1 |
| 2,3-dimethyldodecane | $C_{14}H_{30}$ | −51 | 2 |
| 2,4-dimethyldodecane | $C_{14}H_{30}$ | −59 | 2 |
| 3,5-dimethyldodecane | $C_{14}H_{30}$ | −90 | 2 |

As shown in TABLE 1, the freezing point of n-tetradecane is higher than the freezing points of the mono-branched isomers and substantially higher than the freezing points of the di-branched isomers. Thus, it is believed that by converting the n-tetradecane into an isomerized mixture containing branched alkanes, and preferably containing multi-branched alkanes, the overall freezing point of the isomerized mixture may decrease.

In some embodiments, the alkane starting material may be hydroisomerized by adding the alkane starting material to a suitable vessel and charging the vessel with a hydroisomerization catalyst. For example, the vessel may be charged with a catalyst such as Pt/US-Y zeolite, which may be added such that the vessel contains about 0.5 wt. % of the catalyst, based on the total weight of the catalyst and the alkane starting material. The alkane starting material and the catalyst then may be heated and pressurized in the presence of hydrogen to initiate the hydroisomerization.

The isomerization reaction sequence may be initiated through the establishment of an olefin population in near equilibrium with its alkane counterpart formed on the metal function of the catalyst. Without intent to be bound by theory, it is believed that the olefins migrate to an acid site, where they are protonated as the enabling step to a variety of subsequent possible reactions. When operating under ideal hydroisomerization conditions, a given molecule undergoes only a single isomerization of the alkane backbone before being rehydrogenated to an unreactive alkane. Because the rate at which methyl groups can migrate along the linear carbon chain is typically much faster than the rate at which further isomerization rearrangements occur, the distribution of isomers within a fraction of a given branching degree (mono-branched, di-branched, tri-branched, etc.) are detected near their equilibrium relative abundances. Thus, as conversion is initiated, mono-methyl branching is observed exclusively.

As the concentration of the mono-branched isomers increases, the rate at which this population undergoes a subsequent isomerization increases, resulting in the appearance and increasing abundance of di-branched isomers. Similarly, as the di-branched population increases, tri-branched isomers can begin to form. While cracking through a β-scission can occur in the protonated olefin at any degree of branching, the activation barrier to such a scission is sufficiently higher than the activation barrier to a branching rearrangement that only low levels of cracking are observed. Once tri-branched isomers form the protonated olefin, cracking proceeds at a rate higher than further methyl branching. Therefore, when seeking to produce a highly isomerized composition of a given carbon number, there is an operating point where the total fraction of methyl branched isomers is at its highest relative abundance. Further conversion results in rapidly increasing cracking at the expense of the most highly isomerized fraction. Thus, in some embodiments, the hydroisomerization reaction conditions may be chosen taking first into account a net selectivity to mono-branched and multi-branched feed isomers as well as loss to cracking as a function of n-alkane (e.g., n-tetradecane) conversion.

In some embodiments, the hydroisomerization may be conducted at a hydroisomerization temperature of from about 200° C. to about 400° C., preferably from about 230° C. to about 300° C. The hydroisomerization vessel may be pressurized to a hydroisomerization pressure of from about 200 psig to about 1200 psig, preferably from about 400 psig to about 800 psig or from about 450 psig to about 800 psig. In some embodiments, a higher pressure may be favorable to gain ease of operability, temperature control, and catalyst stability, for example.

In some embodiments, the hydroisomerization reaction may be continued until the isomerization mixture is substantially devoid of normal alkanes (i.e., to completion). In preferred embodiments, the hydroisomerization reaction may be continued under appropriate conditions such that the isomerization mixture, at equilibrium, has progressed until from about 50% to about 95%, or from about 60% to about 90%, or from about 70% to about 85%, or from about 80% to about 90% of the normal alkanes have been converted to branched alkanes such as mono-branched alkanes and/or multi-branched alkanes. In such embodiments, it may be preferable that the hydroisomerization reaction be stopped before completion, or that conditions be chosen so that the reaction never proceeds to completion, because complete transformation of the normal alkanes to branched alkanes may occur at the expense of yield. Namely, though a fuel composition devoid of normal alkanes after hydroisomerization alone may exhibit a lower freezing point than a fuel composition with some normal alkanes present, ridding the isomerization mixture of normal alkanes may result in a substantially higher amount of cracking products. Cracking products may include alkanes having carbon numbers lower than the desired carbon number of the isomerization mixture, which are formed in situ and do not rejoin with a larger carbon chain to form a branched alkane under equilibrium conditions. Including the short-chain alkanes in the carbon number distribution of the fuel composition may adverse change the characteristics of the fuel composition such as freezing point and narrow boiling point, for example. Therefore, the cracking products may subsequently be removed from the isomerized mixture by distillation or a similar process as waste byproducts.

In some embodiments, cracked products may be removed from the isomerized mixture formed by the hydroisomerization. As discussed above, depending on the hydroisomerization reaction conditions, a portion of the normal alkanes are cracked during the hydroisomerization reaction and do not reform into branched alkanes. Cracked products may be removed by distillation, for example by fractional distillation. In some embodiments, after such a distillation, the isomeric mixture may include greater than 60 wt. %, greater than 70 wt. %, greater than 80 wt. %, greater than 90 wt. %, greater than 95 wt. %, greater than 97 wt. %, greater than 98 wt. %, greater than 99 wt. %, or greater than 99.5 wt. % of alkanes having a single carbon number. The alkanes having a single carbon number may include mono-branched alkanes, multi-branched alkanes, and some remnant normal alkanes.

According to some embodiments, the method for preparing the fuel composition may further include removing at least a portion of the remnant normal alkanes from the hydroisomerized isomeric mixture to form the fuel composition. As described above, in preferred embodiments the hydroisomerization reaction is not continued to completion, because complete hydroisomerization results in losses to yield, owing to formation of cracking products. Thus, in such preferred embodiments, the isomerized mixture necessarily will contain some normal alkanes that may increase the freezing point of a fuel composition containing the isomerized mixture.

In some embodiments, remnant normal alkanes may be removed from the isomerized mixture by solvent dewaxing. In illustrative embodiments, the isomerized mixture may be diluted with a dewaxing solvent. Any suitable dewaxing solvent or solvent mixture may be used, in which the isomerized mixture is miscible. Preferably the dewaxing solvent has a large boiling point difference from all isomers in the isomerized mixture and does not have any azeotropes with the isomers, so as to facilitate removal of the dewaxing solvent after the normal alkanes are removed. Examples of suitable dewaxing solvents include toluene and methylethylketone (2-butanone, MEK), and mixtures thereof. The isomerized mixture may be diluted with the dewaxing solvent at a ratio of one part by weight isomerized mixture to from 1 to 10, from 1 to 7, from 1 to 5, from 1 to 3, from 1 to 2, from 2 to 10, or from 2 to 5 parts dewaxing solvent. In one embodiment, for example, one part by weight of an isomerized mixture of tetradecane isomers may be mixed with 2, 3, 4, 5, or 10 parts by weight of a 50/50 (w/w) mixture of toluene and MEK.

The mixture of the isomerized mixture and the dewaxing solvent is a dewaxing mixture. The dewaxing mixture may be cooled to a temperature between the freezing point of the normal alkane in the isomerized mixture and the branched alkanes in the isomerized mixture. For example, the dewaxing mixture may be cooled to a temperature from −20° C. to −120° C., such as −20° C., −30° C., −40° C., −50° C., −60° C., −80° C., or −100° C., for example, to cause the normal alkanes to solidify or gel. The precise dewaxing temperature depends on the carbon numbers of the components of the isomerized mixture. For example, in some embodiments the dewaxing temperature of an isomerized mixture comprising mostly tetradecanes (C14) may be from −40° C. to about −60° C., for example, whereas the dewaxing temperature of an isomerized mixture comprising mostly decanes (C10) may be substantially lower, such as from −90° C. to about −120° C., for example. The solidified or gelled normal alkanes may sink to the bottom of the dewaxing mixture and may be physically removed such as by filtering, for example. The sinking of the solids or gels may be facilitated by compressing. Alternatively, the liquid branched alkanes may be skimmed from the top of the cooled dewaxing mixture. After the normal alkanes are separated from the branched alkanes, the dewaxing solvent may be removed by distillation or other suitable technique. In preferred embodiments, after the solvent dewaxing, the isomeric mixture may have a normal alkane content of less than 5 wt. %, less than 3 wt. %, preferably less than 2.5 wt. %, less than 2.0 wt. %, less than 1.5 wt. %, less than 1.0 wt. %, or less than 0.5 wt. %.

In some embodiments, in addition to solvent waxing or instead of solvent dewaxing, the remnant normal alkanes may be removed from the isomerized mixture by a suitable distillation technique such as fractional distillation. Such a distillation technique may be advantageous in that it may be conducted in a continuous process, in contrast to solvent dewaxing, which typically is a batch process. The overall effectiveness of the distillation may depend on the boiling point differences of the various alkane isomers, as well as on the column length, the column packing, and the temperature profile of the distillation process.

The fuel composition formed upon removal of the remnant normal alkanes by solvent dewaxing and/or distillation, for example, may have the characteristics of the fuel compositions described above as embodiments of the fuel composition. As such, further embodiments herein are directed to any fuel composition according to embodiments herein that is prepared by any embodiment of the methods described above for preparing a fuel composition.

EXAMPLES

The following examples are offered by way of illustration. One skilled in the art should recognize that the following examples are not meant to be limiting to the scope of the embodiments described above or to the scope of the appended claims.

Production of n-Tetradecane

An n-tetradecane alkane starting material was prepared from 1-tetradecene. The 1-tetradecene as received from Chevron Phillips Chemical Company LP was hydrogenated. A 1-g reactor charge (about 3 mL) of Pt/US-Y catalyst was used. The catalyst was activated in $H_2$ flow at a system pressure of 110 psig, a flow rate of 100 mL/min, and a temperature of 450° C. Once activated, the initial reactor temperature was set. An initial feed rate of LHSV=3/hr was used, and the effluent was monitored for residual olefin content by GC analysis. Because the reduction consumes $H_2$, conditions were set to ensure that a sufficiently high excess of $H_2$ remained at the catalyst bed exit, so as to facilitate complete reduction even as the olefinic remnant became vanishingly small. Therefore, a molar-feed ration of 10 parts $H_2$ to 1 part 1-tetradecene was used at all hydrocarbon feed rates. A reactor temperature of 140° C. and a feed rate of LHSV=8/hr resulted in an alkane starting material without detectable residual olefin.

It was found that hydrogenation of an olefin over the precious metal catalyst proceeded rapidly at modest temperature. An initial 1-tetradecene feed rate equivalent to a LHSV=3/hr at a target bed temperature of 150° C. yielded undetectable levels of residual 1-tetradecene. An exotherm at the top of the catalyst bed of nearly 20° C. was also detected with the traveling internal thermocouple. Subsequently, the target bed temperature was lowered to 140° C. and the hydrocarbon feed rate increased first to LHSV=5/hr, then to 8/hr. At the final conditions, the exotherm diminished to about 10° C. and was spread slightly deeper into the bed, presumably as a consequence of the increasing flow rate of $H_2$ with increased hydrocarbon feed rate. In each case residual 1-tetradecene was undetectable.

The system was run continuously over the course of several weeks. When it was necessary to stop liquid feed, the $H_2$ flow rate was lowered to a stand-by flow of about 20 mL/min while maintaining the bed at 140° C. Upon restarting conversion, $H_2$ flow was returned to process conditions followed by resumption of hydrocarbon feed. Overall, about 3 L of 1-tetradecene were converted to n-tetradecane.

Hydroisomerization Reactor

The reactor system was based on a 0.5-inch OD stainless steel tube of 24-inch length mounted vertically in a three-zone electric furnace. Heater control thermocouples were spot welded to the exterior of the reactor tube at the center of each 6-inch heated zone, and the length of the tube within the heater was covered with a split cylindrical brass tube of ⅛-inch thickness for more even heating. The reactor was fitted with a thermowell made from ⅛-inch stainless steel tubing entering the system at the exit end and extending to about half way into the upper heated zone. Bed temperatures could be measured using a traveling thermocouple within the thermowell. A 20-1 μm sintered stainless steel filter was located in the exit fitting of the reactor tube upon which a wad of quartz wool was placed. For these measurements, 1.0 g of catalyst was used. The Pt/US-Y grains were gently mixed with a four-fold volumetric excess of SiC of a similar size range. The catalyst charge was located near the center of the middle heated zone by first loading an appropriate volume of the SiC into the reactor bottom. The space above the catalyst was similarly filled with SiC.

Liquid and gaseous feeds entered the reactor immediately above the heated zone. Gas flow was controlled using Brooks mass flow controllers. The liquid feed was delivered by an ISCO high pressure syringe pump charged from an external reservoir. Reactor effluent entered a cylindrical pressure vessel where liquids condensed and gases passed on to the manual back-pressure regulator. Upon exiting the system through the back-pressure regulator, the gas stream was directed to a multi-port valve located a short distance from the inlet of an Agilent refinery gas analyzer that could be used to quantify gaseous species. The analyzer was calibrated with certified gas blends. Liquid products were drained from the bottom of the high pressure receiver cylinder through a valve for external analysis.

0.5% Pt/US-Y Zeolite Hydroisomerization Catalyst

Platinum was deposited on a Zeolyst CBV-720 US-Y zeolite by ion exchange to a loading of 0.5 wt. %. The required mass of 6.9 wt % tetraammine platinum (II) chloride solution was diluted with distilled water to yield 90 g of solution, which was used to slurry 10 g of the zeolite powder. The slurry was stirred with a magnetic stir bar. The pH was frequently checked and adjusted to 9.5 using concentrated aqueous ammonia. After a final pH adjustment, the slurry was allowed to stir overnight, resulting in a final pH of 9.4 the following morning. The solid was recovered by vacuum filtration, the cake dried in static air at 120° C. for four hours, and then calcined at 400° C. for four hours. After calcination, a 40-60 mesh fraction was recovered by gently breaking and agitating aggregates on a 40-mesh sieve. A platinum dispersion of 0.16 was determined using a dual isotherm, $H_2$ volumetric adsorption method at 30° C.

Hydroisomerization of n-Tetradecane

The isomerization reactor described above was loaded as described for hydrogenation, and the catalyst was activated in the same manner. The initial task was to construct the selectivity/conversion map, from which a suitable operating point could be identified. Operating conditions were selected to achieve an isomeric composition comprising some triply branched isomers as well as high concentrations of the doubly branched isomers in addition to the singly branched and normal isomers. This resulted in a modest amount of hydrocracking. Because the aim was a single carbon number isomeric composition, the cracked products were removed by distillation. Further details are described below.

Hydroisomerization of the n-tetradecane normal alkane starting material was accomplished with a 0.5% Pt/US-Y zeolite catalyst under nearly ideal bifunctional hydrocracking conditions. An initial operating temperature of 250° C. was selected with a feed rate LHSV=1/hr, a pressure of P=400 psig, and an $H_2$ flow of 8 moles per mole of n-tetradecane. Additional data points were collected at operating temperatures between 240° C. and 280° C. while holding the remaining conditions fixed, as well as points at 280° C. and LHSV=10/hr and 20/hr while maintaining the $H_2$:n-tetradecane molar ratio of 8 and a total pressure of 400 psig. An operating point of 0.88 fractional conversion of the n-tetradecane to isomerized mixture was achieved at 260° C., P=400 psig, LHSV=1/hr, and $H_2$:n-tetradecane molar ratio of 8. Conditions were held until about 1 L of liquid product was collected.

TABLE 2 compiles the sequentially applied operating conditions used to generate the span of conversions while maintaining a system pressure of 400 psig and a $H_2$/n-tetradecane molar feed ratio of 8. Conformity with ideal hydrocracking behavior is confirmed by how well the data points at 280° C. and high LHSV fit with the selectivity data obtained at LHSV=1/hr while changing only the reactor temperature.

TABLE 2

| LHSV (1/hr) | Liquid Feed Rate (mL/min) | Temp (° C.) | Fractional Conversion |
| --- | --- | --- | --- |
| 1 | 0.057 | 250 | 0.81 |
| 1 | 0.057 | 240 | 0.55 |
| 1 | 0.057 | 280 | 0.99 |
| 10 | 0.567 | 280 | 0.70 |
| 20 | 1.134 | 280 | 0.47 |
| 1 | 0.057 | 250 | 0.79 |
| 1 | 0.057 | 255 | 0.75 |
| 1 | 0.057 | 260 | 0.87 |
| 1 | 0.057 | 265 | 0.98 |

Figure 1:
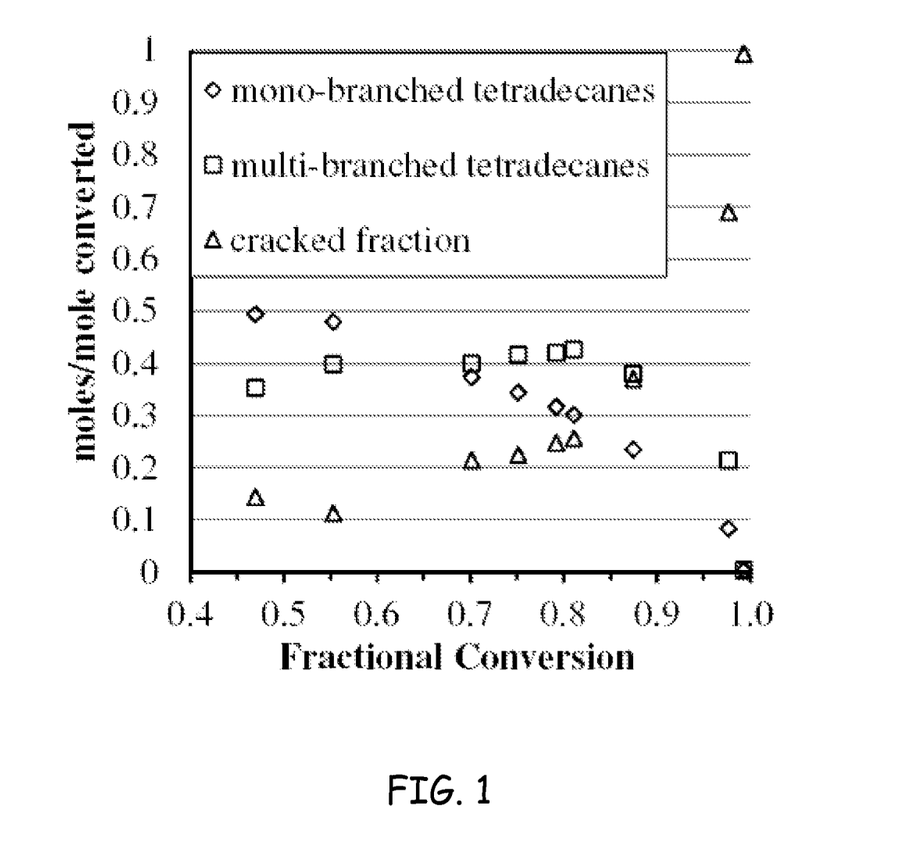
FIG. 1 plots product selectivity to mono-branched feed isomers, multi-branched feed isomers, and cracked products as a function of conversion from normal alkanes resulting in an isomeric mixture for fuel compositions according to embodiments described herein.

FIG. 1 shows the selectivity to mono-branched and multi-branched tetradecane products along with the fraction lost to cracking as a function of n-tetradecane conversion. Distinguishing the mono-branched products from products with higher branching in the chromatogram is simplified by the small number of individual products and their clear separation from other constituents in the recovered liquid. Resolution of the multi-branched products into individual classes, such as di-branched, tri-branched, etc. is not possible due to the complexity of the chromatogram.

It was found that, though it is possible to reduce the residual normal component with increasing conversion, a residual normal fraction of less than 0.2 requires an overall conversion greater than 0.85. But at such high conversions, the cracked fraction increases rapidly above 0.4. At the highest conversions, where over 90% of the conversion from normal alkane can be attributed to cracking, the residual normal feed alkane remains a substantial fraction of the tetradecane liquid recovered. This indicates that a strategy for the preparation of hundreds of gallons of highly isomerized tetradecane based exclusively on a hydroisomerization step followed by removal of normal alkanes may depend on the tolerable remaining normal alkane fraction which allows compliance with the aviation fuel freezing point specification.

To gauge what level of remaining normal alkane might be tolerable for meeting the freezing point specification while maintaining satisfactory yield, a conversion of 0.81 was operated sufficiently long to collect enough product liquid for distillation. The light components were distilled over and the liquid remaining in the pot analyzed. Tetradecane made up just over 95 wt. % of the recovered liquid. This composition, with 23 wt. % n-tetradecane, had a freezing point of −13° C., much closer to the 6° C. freezing point of neat n-tetradecane than the targeted −47° C. JP-8 specification.

A second attempt was made by operating for an extended time at a conversion of 0.88. But rather than simply distilling off the light cracking components from the mixture and retrieving the entire tetradecane fraction, distillation was continued and small incremental fractions were taken in the hopes of changing the relative concentration of n-tetradecane in each successive cut. The continued distillation resulted in collection of a small volume of tetradecane with a residual n-tetradecane concentration of 7 wt. % that had a freezing point of −27° C. Though this was an improvement over the previous value, it was still quite distant from the target.

Considering FIG. 1, it is believed that forcing even higher conversion will not reduce the residual normal content much below 10%. Further, at the extremely high conversions that would be required, FIG. 1 shows that the amount of tetradecane that could be recovered becomes impractically small. For this reason, it is believed that hydroisomerization alone may not be a feasible strategy for preparing practical quantities of isomerized tetradecane having a minimal normal alkane content and meeting the JP-8 freezing point specification. Thus, as described below, a further dewaxing process was undertaken.

Separation of Tetradecane Isomers from Cracked Products

A spinning band fractionating distillation unit (B/R Instrument Corporation model M690) was used to separate the tetradecane isomer mixture from the associated cracked products. Conditions were determined that resulted in a final tetradecane isomer mixture left in the distillation pot which was about 98 wt. % tetradecane isomers and roughly equal masses of minor contributions with both larger and smaller carbon numbers. The initial 1-tetradecene used to produce the n-tetradecane alkane starting material contains slightly over 1% $C_{16}$ alkanes.

Solvent Dewaxing

Solvent dewaxing of the hydroisomerized mixture was carried out using a 1:1 (w/w) mixture of toluene and methyl ethyl ketone as the solvent. Mixtures of tetradecane isomers with solvent in 1:2, 1:3, and 1:5 relative ratios were examined. In a typical trial, 60 mL of the tetradecane mixture are mixed with the appropriate amount of solvent. The composite mixture is then divided equally among three test tubes of 25 mm diameter and 200 mm length. These tubes are submerged in a programmable refrigerated methanol bath (normally used for low temperature viscosity measurements) at a starting temperature of −20° C. The bath is ramped down in temperature over a 2-hour period to −40° C. After at least 60 minutes at −40° C., the solids that form are compressed to the bottom of one tube using a wad of filter paper. Once the solids are compressed, the tube is withdrawn from the bath and the remaining liquid is recovered. During the compression, it is possible for some solids to slip by the filter paper and end up in the top portion of the tube, which could influence the detected composition. The solids are also thawed and collected. The bath is then cooled to −50° C., and the solids separation and recovery are repeated in a second tube before finally lowering the bath temperature to −65° C. and repeating the process a final time. Samples of both the clear liquid and the thawed solid are analyzed by GC to determine the composition of the tetradecane fraction.

The GC analysis confirmed that the n-tetradecane content of the recovered liquid fraction could be reduced by separation of the solidified portion. Therefore, an improved compression filter was devised. A perforated washer, near in diameter to the test tube inner diameter, was welded to a 0.5-inch stainless steel tube and used as a plunger. A plug of cotton was secured to the washer with a covering of permeable paper. This resulted in much better confinement of solids. With this improvement, recovered liquids as well as remelted solids were separated from the solvent using a rotary evaporator with a water bath held at 80° C. The recovered tetradecane liquid was analyzed by GC and the freezing point of the solvent stripped soluble fraction determined. Residual n-tetradecane contents in the isomeric mixtures with respect to both n-tetradecane:solvent ratio and bath temperature are summarized in TABLE 3.

TABLE 3

| | tetradecane:solvent ratio | | | | | | |
| --- | --- | --- | --- | --- | --- | --- | --- |
| | 1:5 | 1:5 | 1:5 | 1:5 | 1:3 | 1:2 | 1:2 |
| Bath Temperature (° C.) | −40 | −50 | −60 | −65 | −65 | −65 | −65 |
| Residual n-tetradecane (wt. %) | 9.4 | 8.1 | 4.3 | 1.3 | 2.2 | 1.3 | 0.5 |

With the preliminary indication that the n-tetradecane could be nearly eliminated, the improved filtration plunger was used to better segregate the fractions, allowing for freezing point determination of the solvent-stripped, recovered tetradecane liquid. Clearly, a temperature no higher than −65° C. was required to reliably suppress n-tetradecane to the extent required to meet the −47° C. freezing point of JP-8. The results with the 1:3 ratio are presented to underscore this point.

In the process of removing the test tube from the bath and separating the liquid from the compressed solid, a delay was encountered which allowed the tube to warm slightly. During the actual execution of the operation, it was unclear how important such a brief delay might be. Clearly, the resulting n-tetradecane content of 2.2% was more than enough to elevate the freezing point of the mixture to above the −47° C. specification. It should be noted that the two entries in TABLE 3 with the ratio of 1:2 show the same apparent freezing point, even though the residual n-tetradecane content differed by more than a factor of 2. This is an artifact of the freezing point measurement. Although several values are reported as −71° C., this value is the lowest reliable freezing point measurable with the automated unit used for this determination. Thus, once this value is reached, no further information about the true freezing point is available.

Based on the above process steps, it is believed that a reasonable yield of the branched tetradecane would be around 40% of the starting alkane in the absence of a second round of processing and recovery. This is based on a recovery of 75% tetradecane from the isomerization conversion, followed by a 55% recovery of branched isomers from the aggregate. Further investigation was conducted to determine whether loss of branched tetradecane may be due to occlusion or to the onset of further differential solidification. The signal intensity distribution of the branched fraction in the GC analysis of the liquid recovered containing 0.5% residual n-tetradecane was compared with that observed in the mixture prior to solvent dewaxing. The results of this comparison are shown in FIG. 2.

Figure 2:
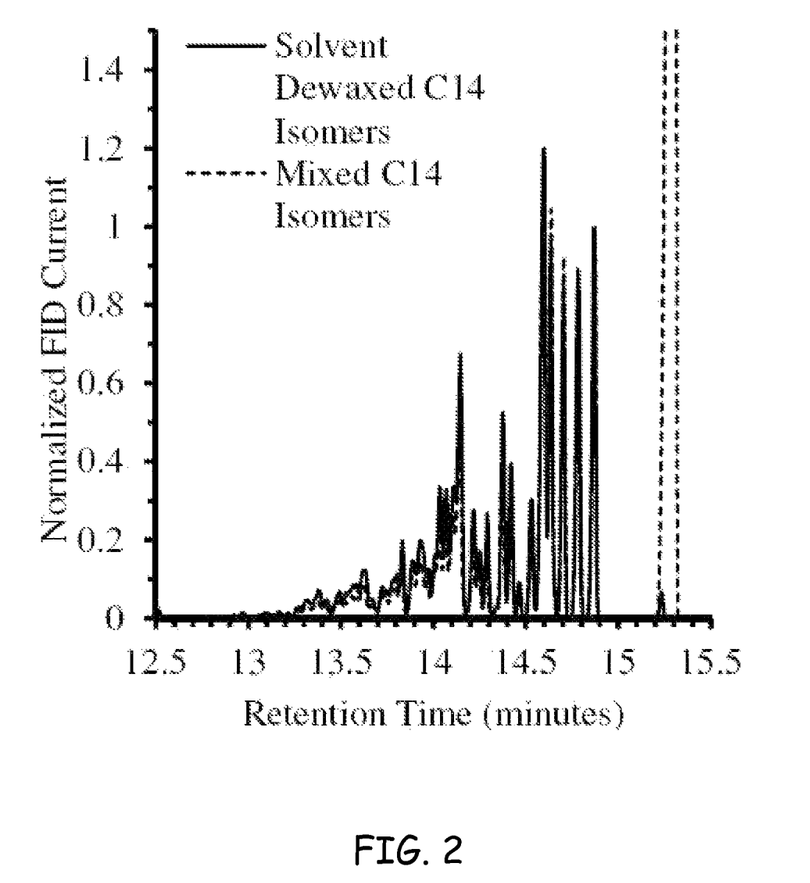
FIG. 2 plots relative populations of mono-branched and multi-branched isomers in an isomeric mixture after a solvent dewaxing procedure included in embodiments of methods for preparing fuel compositions described herein.

Both chromatograms in FIG. 2 are normalized to peak FID current of the 3-methyltridecane isomer observed at a retention time near 14.87 minutes. The multi-branched alkanes collectively have a shorter retention time than the monobranched alkanes, and the normal alkane remnant had a retention time of between 15.2 minutes and 15.3 minutes. If there were no differential crystallization, the intensity distribution of the branched tetradecane contribution in both samples would be perfectly superimposed. However, the apparent intensity of the multibranched isomer fraction showed a systematic relative attenuation in the full complement of isomers relative to that observed in the solvent dewaxed isomer distribution. If monomethyltridecanes are preferentially lost to the solid, normalizing on the diminished fraction will artificially elevate the apparent intensity of the higher branched isomers. While this results in a slight yield loss, it actually increases the relative contribution of multibranched isomers to the final isomer composition.

Figure 3:
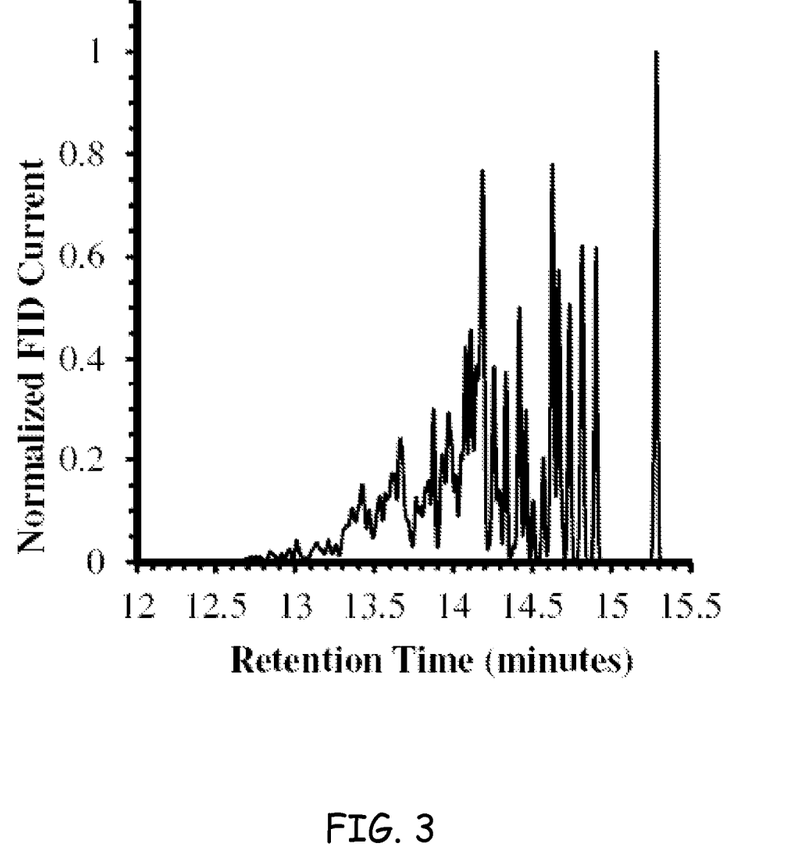
FIG. 3 plots an isomer distribution of an example fuel composition, prepared according to methods described herein, in which abundance of multi-branched isomers is elevated relative to mono-branched isomers.

An isomer distribution of an example fuel composition prepared according to the procedures above using Pt/US-Y zeolite catalyst is provided in FIG. 3. In this composition, the multibranched fraction accounted for over 60% of the total carbon distribution. The residual normal alkane fraction accounted for about 7% of the total alkane content. However, producing such a distribution comes at the expense of yield. A total conversion of 98% is required with about 68% cracking. When losses from solvent dewaxing are factored in, a likely net yield of only 10% to 15% remains. When making practical quantities, a yield loss of this magnitude is unappealing. Nevertheless, as will be illustrated through the Example Compositions below, the above-described methods provide pathways to fuel compositions containing isomerized components with a distribution rich in multi-branched components.

Example Compositions

Example fuel compositions were prepared according to the procedures described above. The distributions of carbon numbers in the fuel compositions are tabulated in TABLE 4 for Example 1 and in TABLE 5 for Example 2. Each tabulation includes the total weight percent of a given alkane length by carbon number, based on the total weight of the fuel composition; the weight percent of normal alkanes of the given length, based on the total weight of the fuel composition; and the weight percents of branched alkanes of the given length, based on the total weight of the fuel composition distribution, broken separately into mono-branched alkanes and multi-branched alkanes. For each carbon number listed in the tabulations, the total alkane equals the sum of the normal alkane plus the mono-branched alkane plus the multi-branched alkane.

TABLE 4

Example 1 fuel composition with freezing point of −41° C.

| Carbon Number | Total Alkane | Normal Alkane | Branched Alkane | | Total |
|---|---|---|---|---|---|
| | | | Mono-branched | Multi-branched | |
| C1-C8 | 0.00% | 0.00% | — | — | 0.00% |
| C9 | 0.04% | 0.00% | — | — | 0.04% |
| C10 | 0.18% | 0.04% | — | — | 0.14% |
| C11 | 0.29% | 0.03% | — | — | 0.26% |
| C12 | 0.48% | 0.20% | — | — | 0.28% |
| C13 | 0.00% | 0.00% | — | — | 0.00% |
| C14 | 98.51% | 2.18% | 40.82% | 55.52% | 96.34% |
| C15 | 0.15% | 0.00% | — | — | 0.15% |
| C16 | 0.23% | 0.00% | — | — | 0.23% |
| C17 | 0.06% | 0.00% | — | — | 0.06% |
| C18 | 0.04% | 0.00% | 0.01% | 0.03% | 0.04% |
| C19 | 0.01% | 0.00% | — | — | 0.01% |
| C20 | 0.01% | 0.00% | — | — | 0.01% |
| C21-C25 | 0.00% | 0.00% | — | — | 0.00% |
| TOTAL | 100% | 2.45% | 40.83% | 55.55% | 97.56% |

TABLE 5

Example 2 with freezing point of −70° C.

| Carbon Number | Total Alkane | Normal Alkane | Branched Alkane | | Total |
|---|---|---|---|---|---|
| | | | Mono-branched | Multi-branched | |
| C1-C8 | 0.00% | 0.00% | — | — | 0.00% |
| C9 | 0.02% | 0.00% | — | — | 0.02% |
| C10 | 0.17% | 0.04% | — | — | 0.13% |
| C11 | 0.29% | 0.04% | — | — | 0.26% |
| C12 | 0.49% | 0.21% | — | — | 0.29% |
| C13 | 0.00% | 0.00% | — | — | 0.00% |
| C14 | 98.51% | 1.25% | 41.18% | 56.08% | 97.26% |
| C15 | 0.16% | 0.00% | — | — | 0.16% |
| C16 | 0.25% | 0.00% | — | — | 0.25% |
| C17 | 0.04% | 0.00% | — | — | 0.04% |
| C18 | 0.04% | 0.00% | 0.01% | 0.03% | 0.04% |
| C19 | 0.01% | 0.00% | — | — | 0.01% |
| C20 | 0.01% | 0.00% | — | — | 0.01% |
| C21-C25 | 0.00% | 0.00% | — | — | 0.00% |
| TOTAL | 100% | 1.54% | 41.19% | 56.11% | 98.47% |

Though each example fuel composition contained 98.51 wt. % tetradecane isomers, the Example 1 fuel composition contained 2.18 wt. % n-tetradecane and the Example 2 fuel composition contained 1.25 wt. % n-tetradecane. The Example 1 fuel composition contained a slightly higher ratio of multi-branched alkane to mono-branched alkane than did the Example 2 composition. The freezing point of the Example 1 composition was about −41° C., and the freezing point of the Example 2 composition was about −70° C. These example fuel compositions illustrate a sharp increase of freezing point of the fuel compositions owing to a relatively small increase in normal alkane content.

Freezing Point Dependence on n-Tetradecane Content

The effect of the residual normal fraction on the measured freezing point was further quantified. Beginning with the dewaxed isomer mixture, containing a normal remnant of 0.44%, a series of compositions was prepared with increasing normal tetradecane weight percent and the freezing points of the samples were determined as prescribed by ASTM D-5972. The results are shown in TABLE 6.

TABLE 6

| Example | Weight % n-tetradecane in tetradecane mixture | Freezing Point of mixture (° C.) |
|---|---|---|
| 1 | 13.8 | −18 |
| 2 | 9.7 | −22 |
| 3 | 7.1 | −25 |
| 4 | 5.1 | −30 |
| 5 | 3.7 | −34 |
| 6 | 2.3 | −40 |
| 7 | 1.4 | −45 |
| 8 | 0.4 | −70 |

As illustrated in TABLE 6, as n-tetradecane content decreases, the impact on freezing point becomes incrementally greater. This is most pronounced at the lowest n-tetradecane content, for which a 25° C. drop in freezing point occurs with only a 1 wt. % absolute change in n-tetradecane content. It was also apparent that the freezing point was sensitive to even slight changes in n-tetradecane content as the n-tetradecane content became vanishingly small. At the lowest n-tetradecane content of 0.4 wt. %, the freezing point lay far below the JP-8 specification of −47° C. At such low true freezing points, the instrumentation used to measure the freezing point according to ASTM D-5972 reaches a minimum meaningful value near −70° C. If the true freezing point falls below this value, a true freezing point is not returned by the method.

Thus, the foregoing Examples have demonstrated the preparation of mixtures of predominantly methyl-branched tetradecane alkane isomers. A freezing point below −47° C., the specification value for JP-8 fuel, has been attained using an approach that is amenable to scaling for preparing practical quantities of such a mixture. The isomeric composition was achieved by subjecting n-tetradecane to hydroisomerization using a 0.5% Pt/US-Y zeolite catalyst at a fractional conversion just under 0.9. The cracked products formed at this conversion were efficiently separated from the tetradecane fraction by fractional vacuum distillation. To achieve the targeted freezing point, the residual n-tetradecane content was reduced further using a solvent dewaxing method with solvent composed of a 50/50 mixture of methyl ethyl ketone and toluene at a solvent:tetradecane ratio between 1:2 and 1:5. Direct production of the isomer mixture based only on sequential hydroisomerization and hydrocracking failed, owing to an unacceptably high residual n-tetradecane proportion as well as to unacceptably high losses due to cracking at the conversion required to minimize the normal residual. Using the nearly n-tetradecane-free isomer mixture as a starting point, the dependence of the measured freezing point on the n-tetradecane content was determined. This measurement demonstrated a pronounced sensitivity of the freezing point to quite small changes in n-tetradecane content, particularly as the n-tetradecane content fell below 1 wt. %.

Unless otherwise defined, all technical and scientific terms used herein have the same meaning as commonly understood by one of ordinary skill in the art to which the invention belongs. The terminology used in the description herein is for describing particular embodiments only and is not intended to be limiting. As used in the specification and appended claims, the singular forms "a," "an," and "the" are intended to include the plural forms as well, unless the context clearly indicates otherwise.

Unless otherwise indicated, all numbers expressing quantities of ingredients, properties such as molecular weight, reaction conditions, and so forth as used in the specification and claims are to be understood as being modified in all instances by the term "about." Accordingly, unless otherwise indicated, the numerical properties set forth in the specification and claims are approximations that may vary depending on the desired properties sought to be obtained in embodiments of the present invention. Notwithstanding that the numerical ranges and parameters setting forth the broad scope of the invention are approximations, the numerical values set forth in the specific examples are reported as precisely as possible. One of ordinary skill in the art will understand that any numerical values inherently contain certain errors attributable to the measurement techniques used to ascertain the values.

It is noted that terms like "preferably," "commonly," and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment.

For the purposes of describing and defining terms herein, it is noted that the term "substantially" is used to represent the inherent degree of uncertainty that may be attributed to any quantitative comparison, value, measurement, or other representation. The term "substantially" is used herein also to represent the degree by which a quantitative representation may vary from a stated reference without resulting in a change in the basic function of the subject matter at issue. As such, it is used to represent the inherent degree of uncertainty that may be attributed to any quantitative comparison, value, measurement, or other representation, referring to an arrangement of elements or features that, while in theory would be expected to exhibit exact correspondence or behavior, may in practice embody something slightly less than exact.

It should be apparent that modifications and variations to the embodiments and Examples described above are possible without departing from the scope of the appended claims. Although some embodiments are identified herein as preferred or particularly advantageous, it is contemplated that the appended claims are not to be limited to these preferred embodiments and Example compositions.

What is claimed is:

1. A fuel composition comprising:
   at least 97 wt. %, based on the total weight of the fuel composition, of an isomerized component consisting of aliphatic paraffin isomers all having the molecular formula $C_{14}H_{30}$, the aliphatic paraffin isomers selected from the group consisting of normal $C_{14}H_{30}$, monomethyl-branched $C_{14}H_{30}$ isomers, and multimethyl-branched $C_{14}H_{30}$ isomers, wherein the isomerized component contains less than 5.0 wt. % normal $C_{14}H_{30}$, based on the total weight of the isomerized component;
   a ratio by weight of monomethyl-branched $C_{14}H_{30}$ isomers to multimethyl-branched $C_{14}H_{30}$ isomers in the fuel composition of less than or equal to 1:1; and
   a normal alkane content of less than 2.0 wt. %, based on the total weight of the fuel composition,
   wherein the fuel composition has a freezing point of less than −47 ° C. as determined by ASTM D-5792.

2. The fuel composition of claim 1, wherein the isomerized component consists of:
   at least 50 wt. % multimethyl-branched $C_{14}H_{30}$ isomers, based on the total weight of the isomerized component;
   from 30 wt. % to 50 wt. % monomethyl-branched $C_{14}H_{30}$ isomers, based on the total weight of the isomerized component; and
   less than 5 wt. % normal $C_{14}H_{30}$, based on the total weight of the isomerized component.

3. The fuel composition of claim 1, comprising at least 98 wt. % isomerized component, wherein the isomerized component consists of:
   at least 50 wt. % multimethyl-branched $C_{14}H_{30}$ isomers, based on the total weight of the isomerized component;
   from 35 wt. % to 45 wt. % monomethyl-branched $C_{14}H_{30}$ isomers, based on the total weight of the isomerized component; and
   less than 2.0 wt. % normal $C_{14}H_{30}$, based on the total weight of the isomerized component.

4. A method for preparing a fuel composition, the method comprising:
   hydroisomerizing an alkane starting material comprising normal alkanes to form an isomerized mixture containing mono-branched alkanes, multi-branched alkanes, and residual normal alkanes, the alkane starting material comprising at least 90 wt. %, based on the total weight of the alkane starting material, of normal alkane having a single carbon number of from 10 to 22;
   removing at least a portion of the residual normal alkanes from the isomerized mixture to form a fuel composition having a normal alkane content of less than 2.0 wt. %, based on the total weight of the fuel composition, wherein:
   the alkane starting material comprises at least 95 wt. % normal $C_{14}H_{30}$;
   the fuel composition comprises at least 97 wt. %, based on the total weight of the fuel composition, of an isomerized component consisting of isomers of $C_{14}H_{30}$ selected from the group consisting of normal $C_{14}H_{30}$, monomethyl-branched $C_{14}H_{30}$ isomers, and multimethyl-branched $C_{14}H_{30}$ isomers, wherein the isomerized component contains less than 5.0 wt. % normal $C_{14}H_{30}$, based on the total weight of the isomerized component;
   the ratio by weight of monomethyl-branched $C_{14}H_{30}$ isomers to multimethyl-branched $C_{14}H_{30}$ isomers in the fuel composition is less than or equal to 1:1; and
   the fuel composition has a freezing point of less than −47 ° C., as determined by ASTM D-5792.

5. The method of claim 4, wherein the removing of the residual normal alkanes comprises solvent dewaxing.

6. The method of claim 5, wherein the solvent dewaxing comprises:
   mixing the isomerized mixture with a dewaxing solvent to form a dewaxing mixture;
   cooling the dewaxing mixture to a dewaxing temperature at which the normal alkanes solidify or gel and the branched alkanes remain liquid; and
   removing the solidified or gelled normal alkanes from the dewaxing mixture.

7. The method of claim 5, wherein the dewaxing solvent is a 1:1 mixture by weight of toluene and methylethylketone.

8. The method of claim 7, wherein the dewaxing mixture comprises:
   1 part by weight isomerized mixture; and
   from 2 parts to 5 parts by weight dewaxing solvent.

9. The method of claim 7, wherein the dewaxing mixture comprises 1 part by weight isomerized mixture and about 2 parts by weight dewaxing solvent.

10. The method of claim 7, wherein the dewaxing temperature is from about −65 ° C. to about −50 ° C.

11. The method of claim 4, wherein the hydroisomerization is discontinued when from about 60% to about 90% of the normal alkanes have been converted to branched alkanes or cracking products.

12. The method of claim 11, further comprising removing the cracking products from the isomerized mixture between the hydroisomerizing and the removing of the residual normal alkanes.

13. The method of claim 4, wherein the removing of the residual normal alkanes comprises:
   distilling the isomerized mixture to form a normal fraction and a branched fraction; and
   retaining the branched fraction.

14. The method of claim 4, wherein the hydroisomerization comprises contacting the alkane starting material with a Pt/US-Y zeolite catalyst.

15. The method of claim 4, further comprising hydrogenating 1-tetradecene to form the alkane starting material.

* * * * *